Dec. 17, 1946.  A. J. KERCHER  2,412,737
HEATING UNIT AND CONTROL
Filed July 19, 1944
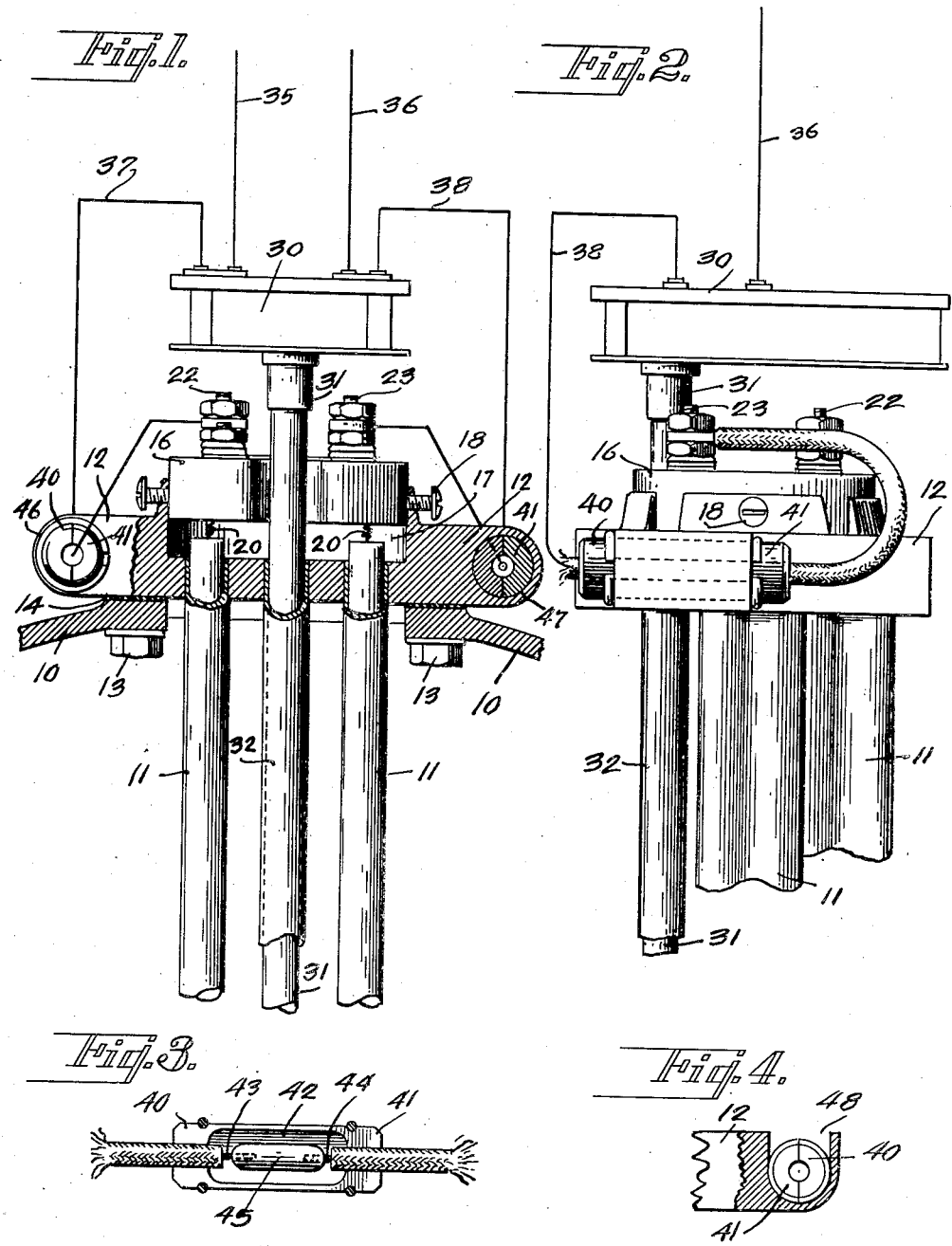
INVENTOR.
ARTHUR J. KERCHER.
BY
ATTY.

Patented Dec. 17, 1946

2,412,737

UNITED STATES PATENT OFFICE 2,412,737

HEATING UNIT AND CONTROL

Arthur J. Kercher, Berkeley, Calif.

Application July 19, 1944, Serial No. 545,673

2 Claims. (Cl. 219—38)

This invention relates to electrical heating units and particularly to safety devices used in connection therewith and applies particularly where it is desired to introduce a safety device to interrupt the flow of current in the event the heating element exceeds a predetermined heat.

Those having had practical knowledge and experience in the art are well acquainted with the fact that at various times thermostatically controlled heaters are improperly connected so that the thermostat cannot serve its purpose; or the thermostat may be left out of the heater or disconnected from it unintentionally; or it may be tampered with by inexperienced mechanics; or it may be broken in handling or shipping. In any such event, electric current may continue to be applied to the heating element and the water or other material being heated may be raised to an elevated temperature. Under such conditions water may be converted to steam or the heating unit may be burned out.

It is an object of the present invention to obviate the difficulties above referred to. It is a further object of the present invention to introduce a thermally responsive safety unit in the electric supply line, which unit is responsive only to an excess of heat in the heating element.

It is a further object of the invention to provide a thermally responsive safety device which will be responsive to the heating element and the tank or other container, and be independent of the conventional thermostatic control unit.

Additional objects of the invention will appear from the following description in which the preferred embodiment of the invention has been set forth in detail in conjunction with the accompanying drawing.

Referring to the drawing:

Figure 1 is a transverse sectional view showing an electrical water heater embodying the safety device of this invention.

Figure 2 is a side elevational view showing an electrical water heater embodying my invention.

Figure 3 is a transverse sectional detail of the fusible element constituting the safety device of my invention.

Figure 4 is a cross-sectional view showing a modified form of the enclosing casing adapted to cooperate with my safety device.

While the heating device of this invention may be employed to heat fluids of any kind, either gases or liquids, it is especially adapted for use as a hot water heater and as shown in Figure 1 is mounted upon a suitable hot water tank 10, with the heating element 11 extending into the tank and with the electrical contacts and control unit being positioned outside of the tank. The heating device illustrated in Figures 1 and 2 corresponds generally to that heating device illustrated and claimed in Kercher and Hicks Patent No. 1,671,592, issued May 29, 1928, and consists of a plurality of heating elements 11 which are secured to a head 12 in such a manner that they are entirely supported by the same so that the entire device may be removed as a unit from the heater. The head 12 is suitably secured to tank 10 as by means of screws or bolts 13. A suitable gasket 14 is inserted between the opposed faces of tank 10 and head 12 to secure a water-tight fit. The heating elements 11 are preferably constructed of a single elongated casing and are then welded, brazed, or soldered to the head 12 as described in said Kercher and Hicks Patent 1,671,592. A suitable insulating block 16 is mounted on the outer side of head 12 in a recess 17 therein as by means of a plurality of bolts 18. Terminal wires 20 of the heating elements 11 are brought out through apertures in the insulating block 16 and are connected to suitable terminals 22 and 23. When terminals 22 and 23 are connected to a suitable source of electric current, the heating device heretofore described is placed in operation.

The thermostatic means incorporated in the structure illustrated in Figures 1 and 2 is generally the same as shown in my Patent No. 2,314,989, issued March 30, 1943, and consists generally of a switch element 30 which is adapted to secure a rapid opening and closing movement of its electrical contacts in response to thermally responsive element 31. As shown in Figure 1 thermally responsive element 31 is in the form of a tube, the mode of operation of which is disclosed in my Patent 2,314,989. Thermally responsive tube 31 is mounted within a second tube 32 which is welded, brazed or soldered to head 12, and which extends into tank 10 and into the medium to be heated. Thermally responsive tube 31 does not come in contact with either the heating device or the heated medium. However it is in heat responsive relation to the water or other medium being heated and operates in response to the temperature of the same.

A plurality of insulated conductors 35 and 36 serve to connect switch element 30 with a suitable supply of current, while a plurality of insulated conductors 37 and 38 serve to connect switch element 30 to terminals 22 and 23 of heating elements 11. As is pointed out in my Patent No. 2,314,989, operation of switch element 30 is controlled by thermally responsive element 31, whereby an increase or decrease of the temperature of the liquid within tank 10 beyond the predetermined range serves to open or close electrical contacts in switch 30 and either disconnect or connect the heating element to a suitable source of electric current.

Interposed in conductors 37 and 38 between thermostatically controlled switch 30 and terminals 22 and 23 I have provided safety devices generally illustrated at 40. As shown in Figure 3, safety device 40 consists generally of two similar split housings 41 adapted to form a hollow core 42. Portions of the insulated conductors 37 or 38 terminate within said hollow core 42, as illustrated. A portion of the insulation of said conductors is removed and the ends of the conductors are spaced sufficiently far apart that arcing will not occur. However termini 43 and 44 are suitably connected as by means of a link 45 of heat fusible material such as solder. Link 45 is adapted to conduct electricity and when in unfused condition permits a flow of current through conductors 37 or 38. However, body 45 is adapted to fuse at a temperature of for example 220° F., and, upon fusion, to disconnect termini 43 and 44 and interrupt the flow of current through the conductors 37 and 38.

Safety devices 40 are adapted to be in heat conductive relationship with and thermally responsive to the metal head 12 and are mounted therein either in orifices 46 and 47 drilled therein as shown in Figure 1, or in recesses 48 therein as shown in Figure 4. Head 12 is in heat conducting relation to tank 10 and its contents, and when tank 10 and head 12 reach an elevated temperature of for example 220° F., this heat is transmitted to safety devices 40 causing fusion of one or both of the links 45 and interrupting the flow of current to heating element 11.

The device heretofore described operates as follows: It will be presumed that the device is set for a predetermined temperature level of operation and that the terminals in thermostatic switch elements 30 connect in a circuit for supplying current to the heating element, which in turn heats the material within tank 10 which is in thermal contact with the thermally responsive element 31. Assuming that the temperature of the water or other material within tank 10 is below the predetermined temperature at which thermostatically responsive switch 30 is set, as heretofore described the circuit will remain closed and current will be supplied to the heating element. However when the temperature of the liquid within tank 10 reaches the predetermined maximum temperature, switch 30 is opened and the circuit is disconnected whereby no further current is supplied to the heating element. Switch 30 generally operates over a spread of 20°, meaning that, for example, when the same is set for example for 180°, the circuit will be opened when the water reaches the temperature of 180° and will not be closed until the temperature decreases to approximately 160°. When the temperature of the liquid being heated reaches the minimum of 160° the thermally responsive switch 30 is closed thereby serving to close the circuit and supply current to the heating element.

All of the foregoing assumes that the thermostatically controlled switch 30 operates properly. However as is well known to those having had practical experience with this type of device, such is not always the case. Therefore let it be assumed that the liquid or other material within tank 10 reaches the predetermined maximum temperature at which thermostatically operated switch 30 is designed to open and halt the supply of current to the heating element. Let it further be assumed that for some reason or other the thermostatically operated switch does not open and the circuit remains closed thereby causing the temperature of the liquid within tank 10 to be raised beyond the predetermined maximum. Current will continue to be supplied to the heating element so long as the circuit remains closed thereby giving rise to the dangers and difficulties heretofore pointed out. Naturally, however, the heat of the liquid within tank 10 will be transmitted to tank 10 and also to head 12. This heat is transmitted to one or both of the safety devices 40 and ultimately to one or both of the fusible links 45. When the heat so transmitted approaches the temperature of approximately 220° F., or any other predetermined heat at which link 45 is designed to fuse, one or both of said links fuse thereby interrupting the flow of current through the conductors 37 or 38, and thereby opening the circuit and cutting off the supply of current to the heating element.

It will be evident that the apparatus described above makes use of relatively simple means to insure the opening of the circuit in the event the conventional thermostatic switch fails to function. The device cannot fail to operate and, once having opened the circuit, prevents its being closed until it has been replaced and the thermostatically controlled switch 30 made operative. The device cannot get out of order and is not subject to the deterioration of time or element nor to the imperfections of mechanical operation.

I claim:

1. In a device of the character described, a tank, a heating device comprising an element extending into said tank and a head outside of said tank and in heat conducting relation thereto, a source of electric current connected to said heating element by suitable conductors, a thermostatically controlled switch adapted to permit or interrupt the flow of current through said conductors to said heating device depending upon the temperature of the material being heated, a safety device interposed in said conductors including said thermostatically controlled switch in said heating device comprising an element having therein an enclosed space, conductors spaced apart at the top and bottom of said space, a fusible element adapted to be vertically mounted between said conductors, said safety devices including a fusible link adapted to be mounted in said head and to be thermostatically responsive thereto, whereby when said thermostatically controlled switch fails to interrupt the flow of current through said conductors to said heating device when the contents of said tank reach a predetermined temperature, and the temperature of said contents exceeds said temperature, the heat of said contents will be transmitted to said safety device and the link will fuse and interrupt the flow of current through said conductors to said heating device, said space being so designed that when said link fuses the fused portion will fall to the bottom of said space, said space being sufficiently large that no arcing will occur between the upper conductor and the lower conductor and the fused material in the bottom of said space.

2. In a device of the character described, an electric heating device connected to a source of electric current by suitable conductors, a portion of said heating device being in thermally responsive relationship to a material being heated, a safety device interposed in said conductors and mounted in a portion of said heating device, said safety device comprising a thermally responsive element having a space therein, a pair of spaced conductors in said space, a fusible link between said conductors, said safety device being thermally responsive to material being heated whereby when the heat of said heating device exceeds a predetermined temperature said link will fuse and flow to the bottom of the space interrupting the flow of current through said conductors to said heating device, said space being sufficiently large that when said fusible link has flowed to the bottom thereof, there will be no arcing between said conductors and the fused material.

ARTHUR J. KERCHER.